C. SCHILLER.
ATTACHMENT TO BABY CARRIAGES.
APPLICATION FILED APR. 16, 1915.
1,192,002.
Patented July 25, 1916.
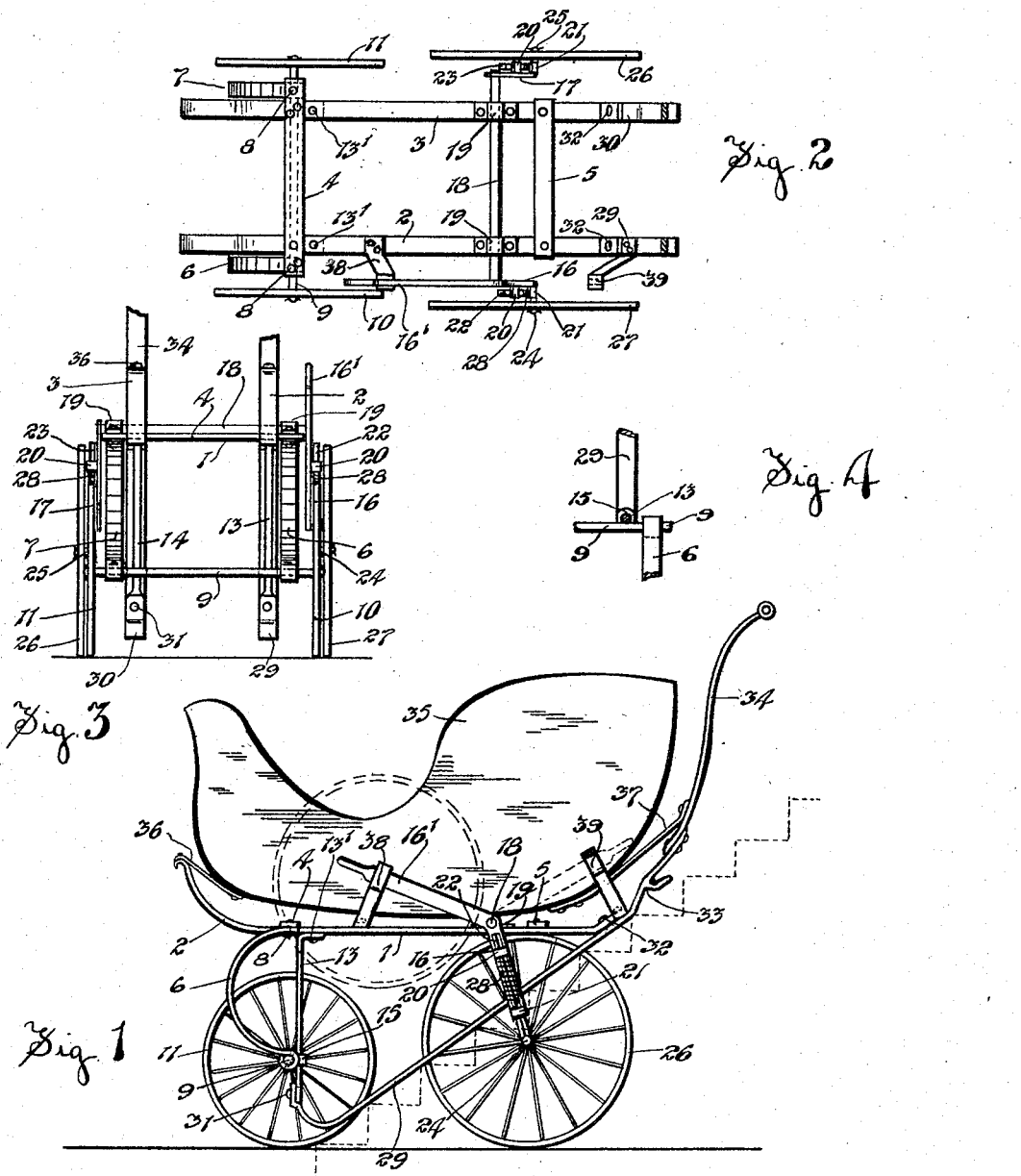
WITNESSES
INVENTOR
C. Schiller
By
Attorney.

UNITED STATES PATENT OFFICE.

CARL SCHILLER, OF WINNIPEG, MANITOBA, CANADA.

ATTACHMENT TO BABY-CARRIAGES.

1,192,002.   Specification of Letters Patent.   Patented July 25, 1916.

Application filed April 16, 1915. Serial No. 21,862.

*To all whom it may concern:*

Be it known that I, CARL SCHILLER, of the city of Winnipeg, in the Province of Manitoba, Canada, have invented certain new and useful Improvements in Attachments to Baby-Carriages, of which the following is the specification.

The invention relates to improvements in attachments to baby carriages and the principal object of the invention is to provide an attachment on a baby carriage whereby the carriage can be taken up or down a flight of stairs easily and quickly.

A further object of the invention is to provide an attachment which can be readily constructed and assembled and which can be produced cheaply yet durably.

A still further object of the invention is to provide an attachment of the above kind which when applied, will not interfere with the efficiency of the carriage in any way when being used in the ordinary way, that is, wheeled about.

With the above objects in view the invention consists essentially in a pair of skids disposed beneath the carriage frame and means for displacing the usual rear carriage wheels to a position above the skids, the parts being arranged and constructed as hereinafter more particularly described and later pointed out in the appended claims.

Figure 1 represents a side view of a carriage with my invention applied, the wheels toward the observer having been removed to expose construction. Fig. 2 represents a plan view of the carriage framework and connected parts, the body being removed. Fig. 3 represents a front view of the lower portion of the carriage. Fig. 4 is a plan view of a portion of the front axle and adjacent parts.

In the drawing like characters of reference indicate corresponding parts in each figure.

1 represents the carriage frame formed from longitudinally disposed side bars 2 and 3 connected by front and rear cross bars 4 and 5.

6 and 7 are a pair of bowed front springs having their upper ends riveted as shown at 8 or otherwise fastened to the cross bar 4 and their lower ends suitably connected, permanently, to the front axle 9 on the ends of which I have suitably mounted the carriage wheels 10 and 11.

13 and 14 represent a pair of upright guide rods having their upper ends permanently fastened at 13' to the side bars 2 and 3 and their lower ends passing slidably through eyes 15 or similar receiving means permanently connected to the front axle. These rods serve to prevent the axle from swinging forwardly or backwardly while allowing it to move upwardly or downwardly in the collapsing or extending of the springs.

16 and 17 are a pair of side arms having their upper ends pivotally mounted on a cross rod 18 carried by suitable bearings 19 permanently fastened to the side members of the frame. The side arm 16 is extended above the pivot point to provide a hand lever 16'. Both of the arms are fitted with a pair of extending lugs 20 and 21 and these pairs of lugs receive, slidably, square shanks 22 and 23, the lower extremities of which carry outstanding stub axles 24 and 25 on which I mount the rear carriage wheels 26 and 27. A spiral spring 28 is mounted on each of the shanks, between the lugs, each spring having the upper end thereof riding against the upper lug and the lower end thereof tied to the shank in any suitable way such as by passing the end of the spring through a cross opening provided in the shank. The squaring of the shanks keeps the back wheels always properly alined with the front wheels, while the springs allow of a cushioning between the rear wheels and the carriage frame.

29 and 30 are a pair of inclined skids in the nature of flat bars, having their forward ends connected permanently as shown at 31, to the lower ends of the guide rods and the rear ends fastened permanently to the rear extremities of the side bars 2 and 3. The upper end of each skid is formed to present a shoulder 33 and these shoulders are used as rests for the carriage when ascending or descending steps as later described.

34 represents the customary handle of the carriage which is secured permanently to the upper extremity of the skids.

35 is the body of the carriage which is suspended forwardly by straps 36 from the upturned forward ends of the side bars 2 and 3 and rearwardly by straps 37 connected to the handle.

38 and 39 represent a pair of clips suitably fastened to the frame and arranged to hold the lever in the extreme position thereof.

As hereinbefore stated, this invention is applied on a carriage to make it an easy matter to take the carriage up and down a flight of stairs with a baby in it without harming or disturbing the baby.

To explain the operation of the invention, I have shown a flight of stairs in dotted outline in Fig. 1 of the drawing, and I have also indicated in this figure, in dotted outline, the position occupied by the rear carriage wheels and also the hand lever when swung for step ascending or descending purposes.

Assuming that one wishes to descend a flight of steps, it is only necessary to grasp the lever and pull it backwardly until it is caught behind the catch 39. This movement of the lever will effect the swinging of both the arms carrying the rear wheels and the displacement of the rear wheels to the position shown in dotted outline in Fig. 1, in which position the said wheels are entirely above the skids. The carriage can then be slid down the steps on the skids with little effort. If one wishes to rest the carriage on the flight of stairs, it is only necessary to tilt the carriage slightly back and allow the shoulders to engage with the front corner of one or other of the steps.

It is to be noticed that in the normal position of the rear wheels, they have a constant tendency to retain the lever locked in the front catch, this being due to the fact that the stub axles of the wheels are to the rear of the cross shaft 18. It is also to be noticed that the front ends of the skids are elevated well above the ground line so that they are not a detriment in any way to the free wheeling of the carriage.

While I have entered into a detailed description of the various parts, these might be modified in the scope of the appended claims without in the least departing from the spirit of the invention.

The inclined skids located beneath the body of the carriage and having their front ends passing more or less tangent to the front wheels, are the most important part of my invention, while the special manner in which these are connected to the carriage and the special manner in which the rear wheels are rendered adjustable to pass above the skids, are considered of secondary importance. These latter constructions will have to be arranged to accommodate the various types of carriages on which the invention is applied.

What I claim as my invention is;—

1. The combination with a carriage frame front and rear axles, wheels, and a handle carrying the frame, of rearwardly extending and upwardly inclined skids, the forward ends of which depend from the front axle and the rear ends of which depend from the handle.

2. The combination with a carriage frame and wheels carrying the frame, of rearwardly extending upwardly inclined skids located beneath the frame and passing in a direction tangential to the circumference of the front wheels and maintaining this position regardless of whether the carriage is used as a slide or as a vehicle.

3. The combination with a carriage frame and wheels carrying the frame, of rearwardly extending upwardly inclined skids located beneath the frame and passing in a direction tangential to the circumference of the front wheels and means for adjusting the rear wheels to expose the skids beneath the same.

4. The combination with a carriage frame and wheels carrying the frame, of a pair of downwardly extending rods secured to the frame forwardly and a pair of inclined skids connecting the lower ends of the rods with the frame rearwardly.

5. The combination with a carriage frame, of a pair of bowed front springs secured to the frame, a front axle carried by the springs, front wheels mounted on the axle, a pair of guide rods secured to the frame and extending downwardly and connected slidably to the front axle, a pair of inclined skids secured forwardly to the lower ends of the rods and rearwardly to the rear end of the frame, said skids passing in a direction tangential to the front wheels and adjustable rear wheels carrying the rear of the frame and arranged to swing upwardly to expose the skids.

Signed at Winnipeg this 8th day of February 1915.

CARL SCHILLER.

In the presence of—
GERALD S. ROXBURGH,
S. SILVERT.

Copies of this patent may be obtained for five cents each, by addressing the "Commissioner of Patents, Washington, D. C."